No. 861,328. PATENTED JULY 30, 1907.
H. STIRRING.
CAR FOR CONVEYING VEHICLES AND TEAMS.
APPLICATION FILED DEC. 24, 1906.
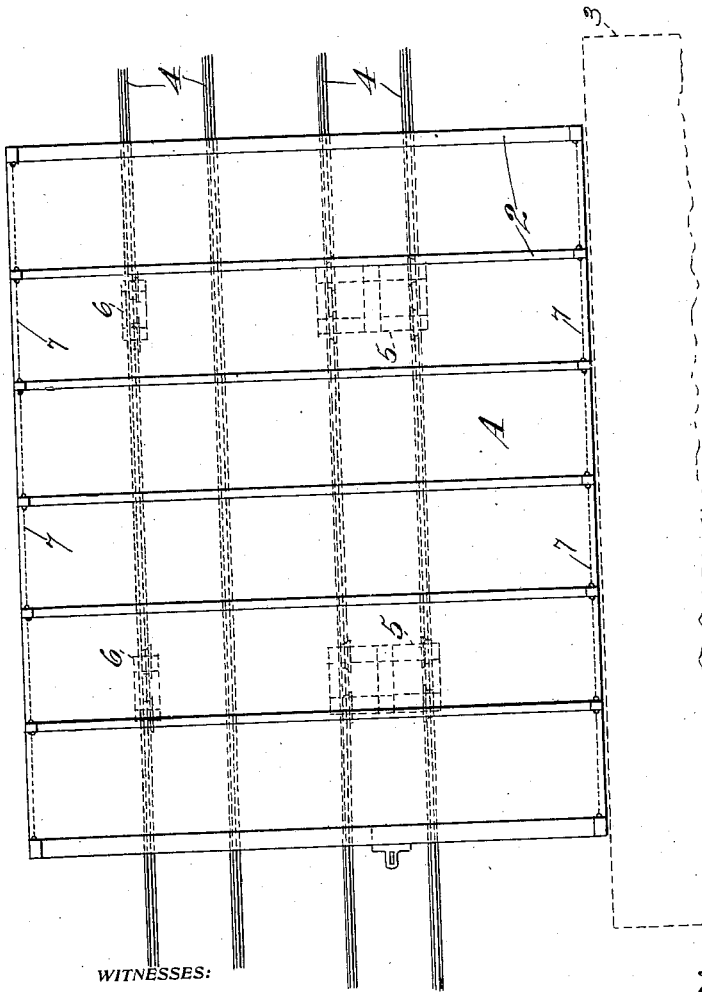
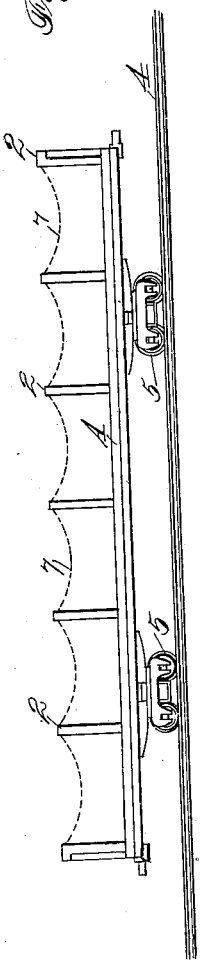
WITNESSES:
INVENTOR
Henry Stirring.
BY
Geo. H. Strong.
ATTORNEY
THE NORRIS PETERS CO., WASHINGTON, D. C.

UNITED STATES PATENT OFFICE.

HENRY STIRRING, OF BERKELEY, CALIFORNIA.

CAR FOR CONVEYING VEHICLES AND TEAMS.

No. 861,328. Specification of Letters Patent. Patented July 30, 1907.

Application filed December 24, 1906. Serial No. 349,305.

*To all whom it may concern:*

Be it known that I, HENRY STIRRING, a citizen of the United States, residing at Berkeley, in the county of Alameda and State of California, have invented new and useful Improvements in Cars for Conveying Vehicles and Teams, of which the following is a specification.

My invention relates to a car or carriage and track therefor, which is designed for the transportation of loaded wagons or teams.

It consists in the combination of parts and details of construction which will be more fully explained by reference to the accompanying drawings, in which—

Figure 1 is a plan view of my device. Fig. 2 is a side elevation.

In the transportation of exceptionally heavy machinery and the like from factories or points where it is manufactured, to points of shipment, it is necessary to load the articles upon heavy specially constructed trucks, often requiring large teams to haul them, and such trucks make exceedingly slow progress over the rough pavements of a city; the expense of horses and men is therefore very considerable.

It is the object of my invention to provide a means for transporting such loads to points of shipment, with the least possible delay and expense, and the invention is applicable at any point where a belt line of railway exists, or where such railway may be laid.

My car consists of an exceptionally strong heavy platform A. This platform may have suitable side and intermediate rails as at 2, extending upwardly above the surface and dividing it into spaces of sufficient width to allow teams to be driven upon the platform. This may be effected by means of an incline, as shown in dotted lines at 3, Fig. 1, or the surface of the platform A may be substantially even with the platform or surface from which the team may be driven directly upon the platform A.

4 are the two lines of track, such as ordinarily employed for street or other railways, and such lines of track may be especially constructed between the points where transportation is desired; either independently or as spur tracks connecting with main inter-communicating lines.

The car is mounted upon wheeled trucks 5 which travel upon one line of rails 4, and these trucks are in such position with relation to the body of the car, that the greater portion of the weight will be supported between these trucks.

The platform extends over the other line of track so far that another series of wheels, as shown in dotted lines at 6, support this overhanging portion of the platform preferably upon the outer rail of the second track. Thus the two sets of trucks are sufficiently separated to provide a stable support for the platform and its load, the greater portion of which will be carried upon the four wheeled trucks 5, and the other truck 6 carries the lighter portion to a sufficient amount to prevent over-balancing.

Chains or other safety devices 7 are fixed at either end of the platform so that in case the animals remain upon the platform, so as to be used at the end of the trip, accidents will be prevented. The platform may thus be loaded at the factory, or other point, with several wagons or trucks which have been previously loaded, and by means of the railway track, the whole load may be transported to one or more points where one or all of the teams are to be disembarked. If the horses are also transported, it is only necessary to provide an inclined or level platform over which they may be driven to leave the car, and several loads may thus be easily and cheaply transferred to different wharves and points of shipment; the railway track enabling such an apparatus to be rapidly transferred from point to point. In many cases it is only necessary to place the trucks, with their loads, upon the platform, and by providing proper means for loading and unloading the trucks therefrom, the teams may be altogether dispensed with, and the wagons can be removed from the platform and the load subsequently transferred to cars or vessels for transportation.

In cases where only a single line of track exists it will be necessary to lay the outside rail on which the single trucks 6 travel at a sufficient distance from the main line of track for the purpose of supporting the overhanging portion of the platform.

In cases where it may be found more advantageous, and where there are two parallel lines of track, four-wheeled trucks may be employed under both sides of the platform, but in any case the disposition of weight should be such that the principal portion will be supported in the line of draft.

Having thus described my invention, what I claim and desire to secure by Letters Patent is—

1. In a transportation device, a platform having a side entrance and having four wheeled trucks in line, disposed nearer to one side than the other, and adapted to travel upon a railway track, other trucks having single lines of wheels supporting the opposite side of the platform, a track parallel with the main track upon which the single line of wheels may travel and means for dividing the surface of the platform into independent stalls for teams.

2. A platform having transversely disposed stalls or partitions extending from side to side, four-wheeled trucks supporting one side of the platform and adapted to travel upon an ordinary railway track, trucks having a
5 single line of wheels supporting the opposite side of the platform, and rails parallel with the first named line of track upon which said single line of wheels may travel.

3. In a transportation device, a platform having a side entrance and having wheeled trucks in line nearer to one side than the other, a track upon which said wheels travel 10 and a second wheeled truck and supporting line of track nearer to the opposite side of the platform.

In testimony whereof I have hereunto set my hand in presence of two subscribing witnesses.

HENRY STIRRING.

Witnesses:
 S. H. NOURSE,
 FREDERICK E. MAYNARD.